United States Patent [19]

McSweeney

[11] Patent Number: 6,103,296
[45] Date of Patent: Aug. 15, 2000

[54] METHOD FOR IMPROVING THE SCREEN BRIGHTNESS OF GADOLINIUM OXYSULFIDE X-RAY PHOSPHORS

[75] Inventor: Robert T. McSweeney, Sayre, Pa.

[73] Assignee: Osram Sylvania Inc., Danvers, Mass.

[21] Appl. No.: 09/064,485

[22] Filed: Apr. 22, 1998

[51] Int. Cl.⁷ .............................. B05D 5/06; C09K 11/08
[52] U.S. Cl. ..................... 427/65; 427/158; 252/301.45
[58] Field of Search ................... 427/65, 58; 252/301.45

[56] References Cited

U.S. PATENT DOCUMENTS

| | | |
|---|---|---|
| 3,418,246 | 12/1968 | Royce .................................. 252/301.4 |
| 3,502,590 | 3/1970 | Royce et al. .......................... 252/301.4 |
| 3,725,704 | 4/1973 | Buchanan et al. ..................... 250/71 R |
| 4,507,560 | 3/1985 | Mathers ................................ 250/483.1 |
| 4,536,436 | 8/1985 | Maeoka et al. ......................... 428/212 |
| 4,925,594 | 5/1990 | Yale ..................................... 252/301.6 |

*Primary Examiner*—Janyce Bell
*Attorney, Agent, or Firm*—Robert F. Clark

[57] ABSTRACT

A method is provided for improving the x-ray screen brightness of gadolinium oxysulfide x-ray phosphors. The method applies annealing and acid washing steps in a specific order following deagglomeration of the phosphor in order to ameliorate the loss of brightness caused by the deagglomeration.

12 Claims, No Drawings

METHOD FOR IMPROVING THE SCREEN BRIGHTNESS OF GADOLINIUM OXYSULFIDE X-RAY PHOSPHORS

TECHNICAL FIELD

This invention relates to the manufacture of gadolinium oxysulfide x-ray phosphors. In particular, this invention relates to methods for increasing the brightness of such phosphors.

BACKGROUND OF THE INVENTION

Gadolinium oxysulfide (GOS) phosphors are used in x-ray screens as x-ray image intensifiers. Examples of these phosphors are given in U.S. Pat. Nos. 3,725,704 and 4,536,436 which are incorporated herein by reference. Phosphor brightness is a key parameter affecting the utility of x-ray intensifying screens and is typically expressed in terms of x-ray optical fluorescence (XOF) brightness (also referred to as plaque brightness) or screen brightness. Screen brightness is determined by forming an x-ray screen containing the phosphor and a binder and then using the screen to create an x-ray film exposure. Because it measures the brightness of the phosphor in situ, screen brightness is a more accurate means of determining the ultimate performance of the phosphor.

In order to produce high quality x-ray screens, it is necessary for the phosphor to be deagglomerated to create the proper particle packing so that maximum screen brightness may be realized. Unfortunately, GOS phosphors such as terbium-activated gadolinium oxysulfide (GOS:Tb) are highly susceptible to brightness loss brought about by the techniques used for deagglomeration. Since commonly used deagglomeration processes involve some type of particle-to-particle or particle to media impact, the deagglomeration processing step induces surface and/or bulk damage in the GOS phosphor particles and causes an increase in the number of fine particles (less than about 1 micron) which have intrinsically lower brightness. For example, after ball milling, microscopic examination of the phosphor particles reveals that some fraction of the primary particles have been broken into two or more pieces. More vigorous ball milling results in more broken particles and lower brightness. Other conventional milling processes such as vibratory milling or attritor milling are thought to be even more damaging than ball milling. And, to a lesser extent, processing steps which involve particle-to-particle impact such as sieving may also reduce brightness.

It would therefore be advantageous to have a finishing process that ameliorates the damage caused by deagglomeration.

SUMMARY OF THE INVENTION

It is an object of the invention to obviate the disadvantages of the prior art.

It is another object of the invention to provide a method for improving the screen brightness of GOS x-ray phosphors.

It is a further object of the invention to provide a finishing method for a deagglomerated GOS x-ray phosphor which ameliorates the damage caused by deagglomeration.

In accordance with one object of the invention, there is provided a method for improving the screen brightness of deagglomerated gadolinium oxysulfide x-ray phosphors. The method involves:

annealing the deagglomerated phosphor at a temperature from about 400° C. to about 800° C. for a time from about 1 hour to about 4 hours; and acid washing the phosphor in a dilute acid having a pH of between about 1 to about 2 at a temperature from about 50° C. to about 80° C. for about 0.5 hours to about 2 hours.

In accordance with another object of the invention, the method provided above includes an additional step wherein the deagglomerated phosphor is subjected to a second annealing after acid washing, the second annealing comprising heating the phosphor to a temperature from about 400° C. to about 800° C. for about 1 hour to about 8 hours.

DESCRIPTION OF THE PREFERRED EMBODIMENTS

For a better understanding of the present invention, together with other and further objects, advantages and capabilities thereof, reference is made to the following disclosure and appended claims.

In general, two methods may be used to increase the brightness of deagglomerated GOS phosphors. These are air annealing and acid washing. A detailed discussion of each of these procedures is given below. Both procedures exhibit their greatest effectiveness when used on a laboratory or small scale (less about 10 kg). However, neither procedure alone is capable of eliminating all of the brightness loss caused by deagglomeration when used on a production scale (greater than about 50 kg). Examples of methods for processing GOS phosphors are provided in U.S. Pat. Nos. 3,418,246, 3,502,590 and 4,925,594 which are incorporated herein by reference.

Air Annealing

Air annealing the phosphor after water washing, either with or without milling, is known to increase brightness and is typically used as a finishing step in GOS production. Exposing the phosphor to air at elevated temperatures induces the formation of an oxysulfate layer on the particle surfaces. While it is not clear whether the exposure to elevated temperatures or the formation of an oxysulfate layer is primarily responsible for the increase the phosphor brightness, current evidence suggests that the presence of an oxysulfate layer can only lower brightness since the oxysulfate has a much lower x-ray excited brightness than the oxysulfide. Furthermore, annealing in a nitrogen atmosphere is known to increase brightness without forming the oxysulfate layer. Consequently, the oxysulfate layer does not appear to be a necessary part of the final product performance but is rather a by-product of the annealing process.

The oxysulfate surface layer, however, does provide protection against hydrolysis which may occur during screen manufacturing and normal handling. More of the phosphor particle, beginning with the surface, is converted to oxysulfate as the annealing temperature is increased above 500° C. or as the annealing time is increased beyond 1 hour. By heating the washed and milled, or milled and washed, phosphor to temperatures from 500° C. to 750° C. for 1 to 4 hours the as-processed phosphor can exhibit an increase in XOF brightness of between 10% to 40% depending on the phosphor particle size and amount of processing damage.

Large size GOS phosphor particles between 7 and 15 $\mu$m require higher annealing temperatures than smaller particles. In general, particle sizes from 3 to 12 $\mu$m require progressively higher annealing temperatures to achieve their optimum brightness gain for the same annealing times and tray loading conditions. Higher net brightness gains are observed for more extensively damaged phosphors. Still, the net increase in brightness for a heavily mill damaged phosphor is typically not enough to offset the loss created by the damage. Furthermore, when the annealing temperature is increased above that needed to maximize brightness, the brightness decreases, probably from the formation of too much oxysulfate. The optimal annealing conditions for a 2 kg batch of 7.0 $\mu$m GOS phosphor held in a 12 inch diameter Pyrex dish are about 600° C. to about 700° C. for about 2 hours. These conditions result in measured weight gains of between 0.025% to 0.25% which correspond to an oxysulfate conversion of between 0.15% to 1.5%.

Acid Washing

After the phosphor has been milled and water washed, acid washing is used to clean the surface of the processed phosphor particles and to remove fine phosphor particles (less than about 1 $\mu$m). During acid washing, the phosphor is loaded into a tank and then suspended in a dilute nitric acid solution having a pH of from about 1 to about 2 and at a temperature of from about 50° C. to about 80° C., and more preferably about 65° C. After agitation for about 30 minutes to about 2 hours, the phosphor particles are allowed to settle out and the supernatant is decanted. About 5 to about 25 weight percent of the phosphor is lost in the acid washing step. The residual phosphor slurry may either then be transferred to a filter crock and filter dried or re-suspended, settled, and decanted until the supernatant conductivity is below 10 $\mu$S, and more preferably <5 $\mu$S, to avoid the possibility of reagglomeration. Like annealing, acid washing is also known to increase phosphor brightness, but to a much lesser extent. Typically, the phosphor exhibits a 1% to 5% increase in XOF brightness after acid washing. Without annealing, no amount of acid washing will raise the phosphor to a useful brightness level.

In prior phosphor processing methods, acid washing was performed immediately after milling and water washing so that the phosphor slurry did not need to be dried between steps. Annealing was performed after acid washing so that the number of steps was minimized. However, what was not evident from the prior methods is that the order in which these processing steps are applied is critical to realizing the phosphor's maximum screen brightness. I discovered that by applying the acid wash and annealing procedures in a particular novel sequence, a tremendous improvement in screen brightness could be achieved for GOS phosphors. More particularly, it was determined that screen brightness was improved dramatically by first annealing the deagglomerated phosphor and then acid washing it to remove fines and impurities. An even greater improvement in screen brightness could be attained by following the acid washing with a second annealing step. The combination of annealing, acid washing and re-annealing returns the phosphor to a state indicative of not having been mill damaged.

EXAMPLES

Terbium activated gadolinium oxysulfide phosphors having the general formula $Gd_2O_2S{:}Tb$ were prepared according to the following general method.

Phosphor Preparation $Gd_2O_3$, $Tb_4O_7$, sulfur, $Na_2CO_3$ or $Na_2CO_3.H_2O$, $NaHPO_4$, $NH_4PF_6$ and $Li_2CO_3$ are mixed in the following proportions: 1 mole $Gd_2O_3$, 2.5 to 3.5 moles sulfur, 0.75 to 1.5 moles $Na_2CO_3$ or $Na_2CO_3.H_2O$, 0.00 to 0.50 moles $NaHPO_4$, 0.00 to 0.25 moles $Li_2CO_3$, 0.00 to 0.05 moles $NH_4PF_6$, and 0.0005 to 0.002 moles $Tb_4O_7$ added as the activator. Preferably, the composition of the mixture is: 1 mole $Gd_2O_3$, 3.00 moles sulfur, 1.00 to 1.5 moles $Na_2CO_3$ or $Na_2CO_3.H_2O$, 0.25 to 0.50 moles $NaHPO_4$, 0.00 or 0.10 moles $Li_2CO_3$, 0.00 or 0.033 moles $NH_4PF_6$, and 0.00100 or 0.00125 moles of $Tb_4O_7$. These mixtures are dry blended for 10 minutes to 2 hours in a blender with an intensifier bar. The blended materials are loaded into covered alumina crucibles and fired in air at temperatures ranging from 1050° to 1250° C. for 1 to 8 hours and preferably from 1100° C. to 1200° C. for 2 to 4 hours. During the firing process the sulfur and sodium compounds form a sodium polysulfide flux which facilitates the conversion of $Gd_2O_3$ and $Tb_4O_7$ to $Gd_2O_2S{:}Tb$ with the activator incorporated in the crystal structure. All other materials are incorporated in the polysulfide flux or are vaporized on firing. The cakes resulting from these firings are either washed clear of fluxes and then ball milled or ball milled with the fluxes present to deagglomerate them.

Ball Milling/Water Wash

The fired material is deagglomerated by combining 27 kg of fired cake, 14 l of deionized (DI) water and 40 kg of YTZ beads as mill media, and ball milling at about 24 rpm (12 to 36 rpm) for 1 to 4 hours until the average phosphor particle size is about 6.5 $\mu$m. The slurry is then removed from the mill, added to a wash tank, diluted with enough hot DI water to fill the tank, and then vigorously agitated for 30 minutes. After being allowed to settle, the supernatant is removed and discarded. The process is repeated until the conductivity of the supernatant is less than 10 $\mu$S. The slurry is then transferred to a filter crock where it is filter dried and then oven dried.

Annealing

The dried material is screened to −200 mesh and loaded into trays for annealing. The annealing temperature can range from about 400 to about 800° C. and preferably from about 650 to about 750° C. The material is annealed for 2 hours, however, the annealing time can be shortened or lengthened for higher or lower annealing temperatures, respectively.

Acid Washing

The annealed material is acid washed in a hot acid solution consisting of hot DI water (50 to 80° C.) and nitric acid. The proportions of acid to phosphor are 42 ml nitric acid in 2 l hot DI water per 1 kg phosphor. The slurry is vigorously agitated for 30 minutes, allowed to settle, and the supernatant is removed and discarded. The tank is refilled with hot DI water and repeatedly washed until the conductivity of the supernatant is less than 5 μS. The slurry is then filter and oven dried.

Second Annealing

The material is screened to −200 mesh and loaded into trays. The second annealing temperature can range from about 400° C. to about 800° C. and preferably from about 450° C. to about 550° C. The second annealing time is from about 1 to about 8 hours and preferably about 2 hours.

Table 1 indicates which finishing steps were applied in each example and the order in which they were applied. Except where noted, the finishing steps were applied on a production scale. Particle size of each finished phosphor was measured by sonic Coulter Counter (5 min.) and the 50% size is reported in Table 1. The finished phosphors were dispersed into a binder solution and made into x-ray screens by conventional screening techniques. The desired screen coating weight was 44.7 g/ft². X-ray film exposures were made with the screens and the optical densities (OD) of the exposures compared with an exposure standard. The difference between the measured OD of the exposed films and the OD of the standard is reported in Table 1 as delta OD. The delta OD measurement is a direct indication of screen brightness; the higher the delta OD value, the higher the x-ray screen brightness. X-ray exposures were made using Kodak Min-r M MRM-1 single emulsion x-ray film (24 ×30 cm) in a Kodak X-Omatic Cassette. The x-ray anode (Polyrhenium target, GE Medical Systems) was operated at 80 kV and 25 ma. Exposure time was 0.035 seconds at 68 inches.

OD of at least about 0.01 over Examples A, B, and C. The greatest improvement in screen brightness was achieved when the annealing and acid wash steps are followed by a second annealing step, as is shown in Examples F, G, I, J, and K. The average delta OD for these examples is about 0.06, which represents an average increase in delta OD of at least about 0.03 over Examples A, B, and C. These results confirm the significant improvement in the screen brightness of GOS phosphors achieved by the method of this invention.

While there has been shown and described what are at the present considered the preferred embodiments of the invention, it will be obvious to those skilled in the art that various changes and modifications may be made therein without departing from the scope of the invention as defined by the appended claims.

I claim:

1. A method for improving the screen brightness of deagglomerated gadolinium oxysulfide x-ray phosphors comprising:
    annealing the deagglomerated phosphor at a temperature from about 400° C. to about 800° C. for a time from about 1 hour to about 4 hours; and
    acid washing the phosphor in a dilute acid having a pH of between about 1 to about 2 at a temperature from about 50° C. to about 80° C. for about 0.5 hours to about 2 hours.

2. The method according to claim 1 wherein the deagglomerated phosphor is subjected to a second annealing after acid washing, the second annealing comprising heating the phosphor to a temperature from about 400° C. to about 800° C. for about 1 hour to about 8 hours.

3. The method according to claim 2 wherein the second annealing temperature is from about 450° C. to about 550° C.

4. The method according to claim 1 wherein the annealing temperature is from about 650° C. to about 750° C.

TABLE 1

| Example | Milled & Water Wash | Acid Wash | Annealed | Acid Wash | 2nd Anneal | Particle Size (μm) | Delta OD @ 44.7 g/ft² |
|---------|---------------------|-----------|----------|-----------|------------|---------------------|------------------------|
| A | yes | no | yes | no | no | 6.36 | 0.019 |
| B | yes | no | yes | no | no | 6.34 | 0.020 |
| C | yes | yes(lab) | yes(lab) | no | no | 6.24 | 0.031 |
| D | yes | no | yes | yes(lab) | no | 6.35 | 0.050 |
| E | yes | no | yes | yes(lab) | no | 6.27 | 0.039 |
| F | yes | no | yes | yes(lab) | yes(lab) | 6.42 | 0.058 |
| G | yes | no | yes | yes(lab) | yes(lab) | 6.18 | 0.057 |
| H | yes | no | yes | yes | no | 6.30 | 0.032 |
| I | yes | no | yes | yes | yes(650° C.) | 6.35 | 0.062 |
| J | yes | no | yes | yes | yes(625° C.) | 6.34 | 0.063 |
| K | yes | no | yes | yes | yes(600° C.) | 6.35 | 0.049 |

(lab) indicates laboratory scale.

Examples A and B had measured delta OD's of about 0.020 at a coating weight of 44.7 g/ft² after production milling, washing and annealing. When an acid wash is done before annealing and the delta OD at 44.7 g/ft² is raised to 0.031, as demonstrated by Example C. Examples D, E and H confirm that a much greater improvement in screen brightness is produced if the acid wash is performed after annealing. The average delta OD for these three samples is about 0.040 which represents an average increase in delta 5. The method according to claim 4 wherein the time is 2 hours.

6. The method according to claim 1 wherein the dilute acid has a temperature of about 65° C.

7. A method for improving the screen brightness of deagglomerated gadolinium oxysulfide x-ray phosphors comprising:

annealing the deagglomerated phosphor at a temperature and for a time sufficient to increase brightness; and acid washing the phosphor in a dilute acid solution to remove phosphor particles having a particle size of less than about 1 μm.

8. The method according to claim 7 wherein the phosphor is subjected to a second annealing after acid washing to yield an additional increase in brightness.

9. The method according to claim 8 wherein an x-ray screen made with the phosphor after the second annealing produces an exposure having an optical density of at least about 0.03 greater than a second exposure made under the same conditions using the same phosphor prepared by a method wherein the acid washing step is followed by the first annealing step.

10. The method according to claim 7 wherein the XOF brightness of the phosphor is increased by 10 to 40% after annealing.

11. The method according to claim 7 wherein about 5 to about 25 weight percent of the phosphor is removed by the acid washing.

12. The method according to claim 7 wherein an x-ray screen made with the annealed and acid washed phosphor produces an exposure having an optical density of at least about 0.01 greater than a second exposure made under the same conditions using the same phosphor prepared by a method wherein the acid washing step preceeds the annealing step.

* * * * *